(12) United States Patent
Nemoto

(10) Patent No.: US 8,827,230 B2
(45) Date of Patent: Sep. 9, 2014

(54) OBJECT HOLDING DEVICE

(75) Inventor: Takehiko Nemoto, Yokohama (JP)

(73) Assignee: Nifco Inc., Yokohama-shi (JP)

( * ) Notice: Subject to any disclaimer, the term of this patent is extended or adjusted under 35 U.S.C. 154(b) by 0 days.

(21) Appl. No.: 13/501,204

(22) PCT Filed: Oct. 8, 2010

(86) PCT No.: PCT/JP2010/006045
§ 371 (c)(1),
(2), (4) Date: Apr. 30, 2012

(87) PCT Pub. No.: WO2011/045917
PCT Pub. Date: Apr. 21, 2011

(65) Prior Publication Data
US 2012/0211635 A1  Aug. 23, 2012

(30) Foreign Application Priority Data

Oct. 13, 2009 (JP) .................................. 2009-236404
Apr. 20, 2010 (JP) .................................. 2010-096712

(51) Int. Cl.
*A01K 97/10* (2006.01)
*B60R 5/04* (2006.01)
*B60P 7/08* (2006.01)
*B60R 11/00* (2006.01)

(52) U.S. Cl.
CPC ....... *B60P 7/0823* (2013.01); *B60R 2011/0071* (2013.01); *B60R 5/04* (2013.01); *B60R 2011/0036* (2013.01); *B60R 11/00* (2013.01)
USPC ........... 248/499; 248/680; 248/681; 248/500; 248/503; 248/505; 254/222; 254/223; 254/225; 224/162; 224/454; 224/455; 224/533; 224/534; 224/42.39; 224/567; 224/568; 242/382; 242/384.7; 242/396.1; 24/614; 24/615; 24/68 CD

(58) Field of Classification Search
USPC ................. 248/680, 681, 500, 499, 503, 505; 24/614, 615, 68 CD; 242/382, 384, 242/396.1; 224/162, 454, 455, 533, 534, 224/42.39, 567, 568; 254/222, 223, 225
See application file for complete search history.

(56) References Cited

U.S. PATENT DOCUMENTS 1,516,489 A * 11/1924 Barton ............................ 24/523
2,449,600 A *  9/1948 Geiger .......................... 410/100
(Continued)

FOREIGN PATENT DOCUMENTS

CN  201204995 Y  3/2009
FR  2903051 A3  1/2008
(Continued)

OTHER PUBLICATIONS

European Patent Office, "European Search Report for EP 10823185.3", Jan. 25, 2013.

*Primary Examiner* — Bradley Duckworth
*Assistant Examiner* — Asha Puttaiah
(74) *Attorney, Agent, or Firm* — Manabu Kanesaka

(57) ABSTRACT

In an object holding device, it is possible to prevent loosening of a cord-like body for holding an object without requiring any user's special operation. The object holding device includes a fixing belt (3) wound on a plastic tank (2), a male buckle (9) provided at a fixing belt, a reel (4) having the fixing belt wound around and urged to rotate in a winding direction of the fixing belt and a reel housing (11) connecting with a male buckle. When the male buckle is connected to the reel housing, a rotation of the reel is restricted at least in a counter-winding direction of the fixing belt.

7 Claims, 21 Drawing Sheets

(56) References Cited

U.S. PATENT DOCUMENTS

| | | | |
|---|---|---|---|
| 3,265,440 A | 8/1966 | Board et al. | |
| 3,288,528 A | 11/1966 | Board et al. | |
| 3,294,447 A | 12/1966 | Riley | |
| 3,323,832 A | 6/1967 | Kirkpatrick | |
| 3,533,588 A * | 10/1970 | Cregier | 248/309.1 |
| 3,891,273 A | 6/1975 | Takada | |
| 4,122,587 A * | 10/1978 | Weiss et al. | 5/621 |
| 4,475,854 A * | 10/1984 | Ericsson | 410/103 |
| 4,627,133 A * | 12/1986 | Bartlow | 24/298 |
| 4,720,148 A | 1/1988 | Anthony et al. | |
| 5,611,520 A * | 3/1997 | Soderstrom | 254/218 |
| 6,292,984 B1 * | 9/2001 | Nelson | 24/134 R |

FOREIGN PATENT DOCUMENTS

| | | |
|---|---|---|
| JP | 2000-006721 | 1/2000 |
| JP | 2005-289342 A | 10/2005 |
| JP | 2005-324766 A | 11/2005 |

\* cited by examiner

OBJECT HOLDING DEVICE

RELATED APPLICATIONS

The present application is National Phase of International Application No. PCT/JP2010/006045 filed on Oct. 8, 2010, and claims priorities from Japanese Applications No. 2009-236404, filed on Oct. 13, 2009 and No. 2010-096712, filed on Apr. 20, 2010.

TECHNICAL FIELD

The present invention relates to an object holding device that holds an object by using a cord-like body such as a rope and a belt, in particular, to an object holding device suitable for holding the object in a luggage room of a vehicle and the like.

BACKGROUND ART

One of conventional known object holding devices installed in a vehicle is an object holding device in which a case having an opening facing the inner side of a vehicle interior is installed on an inner wall of a vehicle body, a rope is wound around a reel provided in the case and stored in the case, and the rope is drawn from only as needed to fix a luggage (refer to Patent Literature 1).

In this object holding device, the reel is urged to rotate in a winding direction of a rope. A hook provided at a front end of the rope is engaged with a striker provided in another site of the vehicle body when feeding the rope, and is located at one end of the opening of the case when winding the rope. A lock knob that prevents rotation in a feeding direction of the reel is provided at the other end of the opening of the case so as to be freely rotatable about a predetermined fulcrum. The lock knob is constituted of a lock operating piece that sinks into the case when locking and an unlock operating piece that sinks into the case when unlocking.

PRIOR ART DOCUMENTS

Patent Documents

Patent Document 1: Japanese patent No. 3612425

SUMMARY OF THE INVENTION

Problems to be Solved by the Invention

According to the above-mentioned conventional technique, when fixing a luggage or the like, the user needs to feed the rope for a needed length and then, operate the lock knob to prevent further rotation in the feeding direction of the reel. However, such operation of the lock knob is disadvantageously burdensome to the user who fixes the luggage. In the case where the user fails or forgets to operate the lock knob, a load in the feeding direction is applied to the rope at acceleration and deceleration of the vehicle, the rope can become loose and thus, the luggage can be shifted in position or fall down.

The present invention is devised in consideration of the above-mentioned problems of the conventional technique. Therefore, the object of the present invention is to provide an object holding device that can prevent looseness of a cord-like body for holding an object without requiring any special operation by the user.

Means for Solving the Problem

In order to solve the above-mentioned problems, a first aspect of the present invention includes a cord-like body (3) wound on an object (2) to be held, an engaging member (9) provided at the cord-like body, a reel (4) having the cord-like body wound around and urged to rotate in a winding direction of the cord-like body and a connecting member (11, 101, 102) connecting to the engaging member. When the engaging member is connected to the connecting member, rotation of the reel is restricted at least in a counter-winding direction of the cord-like body.

According to a second aspect of the present invention, the connecting member may be a reel housing storing the reel therein.

According to a third aspect of the present invention, the reel may include an engaged part (45) engaging with the engaging member and engagement of the engaged part with the engaging member may restrict rotation at least in the counter-winding direction of the cord-like body.

According to a fourth aspect of the present invention, the reel may include a winding shaft (21) having the cord-like body wound around, and a unidirectional clutch (23) allowing a rotation only in the winding direction of the winding shaft when the engaging member is connected to the connecting member.

A fifth aspect of the present invention may further include a wound member (6) having an intermediate part of the cord-like body fed from the reel wound around, and both the connecting member and the wound member may be attached to a wall member (8) configuring a storing part for the object.

A sixth aspect of the present invention may further include a reel housing that stores the reel therein, and the connecting member may be provided apart from the reel housing.

A seventh aspect of the present invention may further include a restricting member (110) provided movably between a restriction position restricting a rotation of the reel at least in a counter-winding direction of the cord-like body and a release position releasing the restriction, and a coupling member (121, 122) attached to the reel housing and coupling the restricting member to the connecting member (101, 102), and when the engaging member is connected to the connecting member, the restricting member may move from the release position to the restriction position through the coupling member.

Effects of the Invention

According to the first aspect of the present invention, since the user only needs to wind the cord-like body on the object and then connect the engaging member to the connecting member in order to restrict the rotation of the reel at least in the counter-winding direction (that is, to prevent further feeding of the cord-like body), it is possible to achieve an advanced effect of preventing looseness of the cord-like body without requiring any special operation by the user.

According to the second aspect of the present invention, the user only needs to connect the engaging member to the reel housing from which the cord-like body is fed, thereby easily preventing looseness of the cord-like body.

According to the third aspect of the present invention, with a simple configuration, when the engaging member is connected to the connecting member, rotation of the reel can be restricted at least in the counter-winding direction.

According to the fourth aspect of the present invention, when the engaging member is connected to the connecting member, rotation of the reel can be easily restricted only in the counter-winding direction. Accordingly, even when the user excessively feeds the cord-like body for holding the object, by winding the cord-like body around the reel again, the looseness of the cord-like body can be prevented.

According to the fifth aspect of the present invention, the object can be stably sandwiched between the wall member that defines the storing part for the object and the cord-like body.

According to the sixth aspect of the present invention, the number and attachment position of the connecting members to which the engaging member is connected can be freely set and thus, various targets different in shape and size can be stably held. In the case where the connecting member and the reel housing are integrally provided, in order to stably hold the target to be held, a relay member for separating both ends of the cord-like body from each other (for example, the wound member on which the intermediate part of the cord-like body fed from the reel) is required. However, such relay member is not required and further, a large load is not applied to the relay member and the cord-like body located between the relay member and the reel.

According to the seventh aspect of the present invention, rotation of the reel can be restricted with the simple configuration.

EMBODIMENTS OF THE INVENTION

First Embodiment

An object holding device in accordance with the first embodiment of the present invention will be described with reference to FIG. 1 to FIG. 11. In the following description, terms representing directions follow directions shown in FIG. 1 to FIG. 3.

Figure 1:
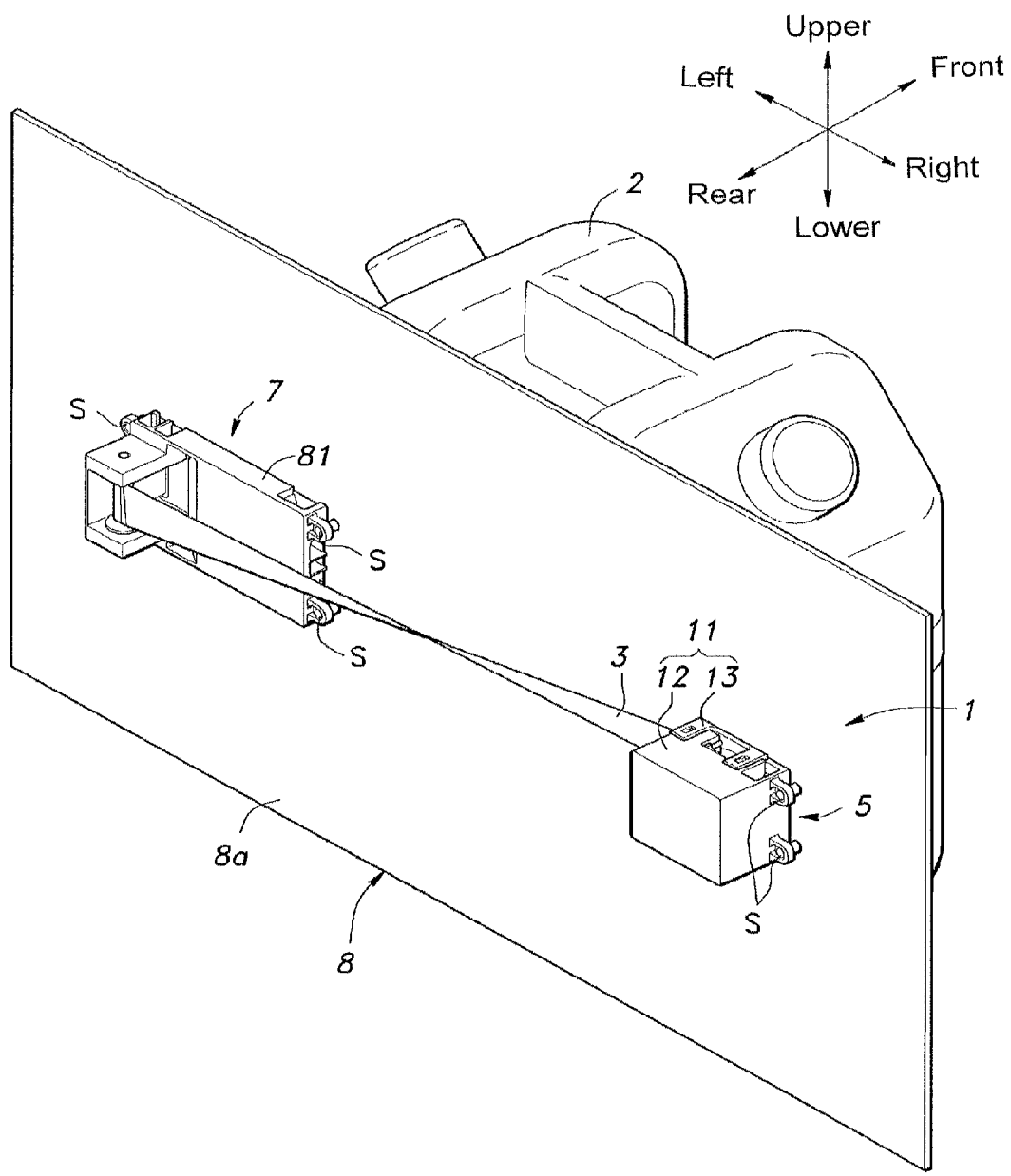
FIG. 1 is a back-side perspective view showing a used state of an object holding device in accordance with a first embodiment.
Figure 2:
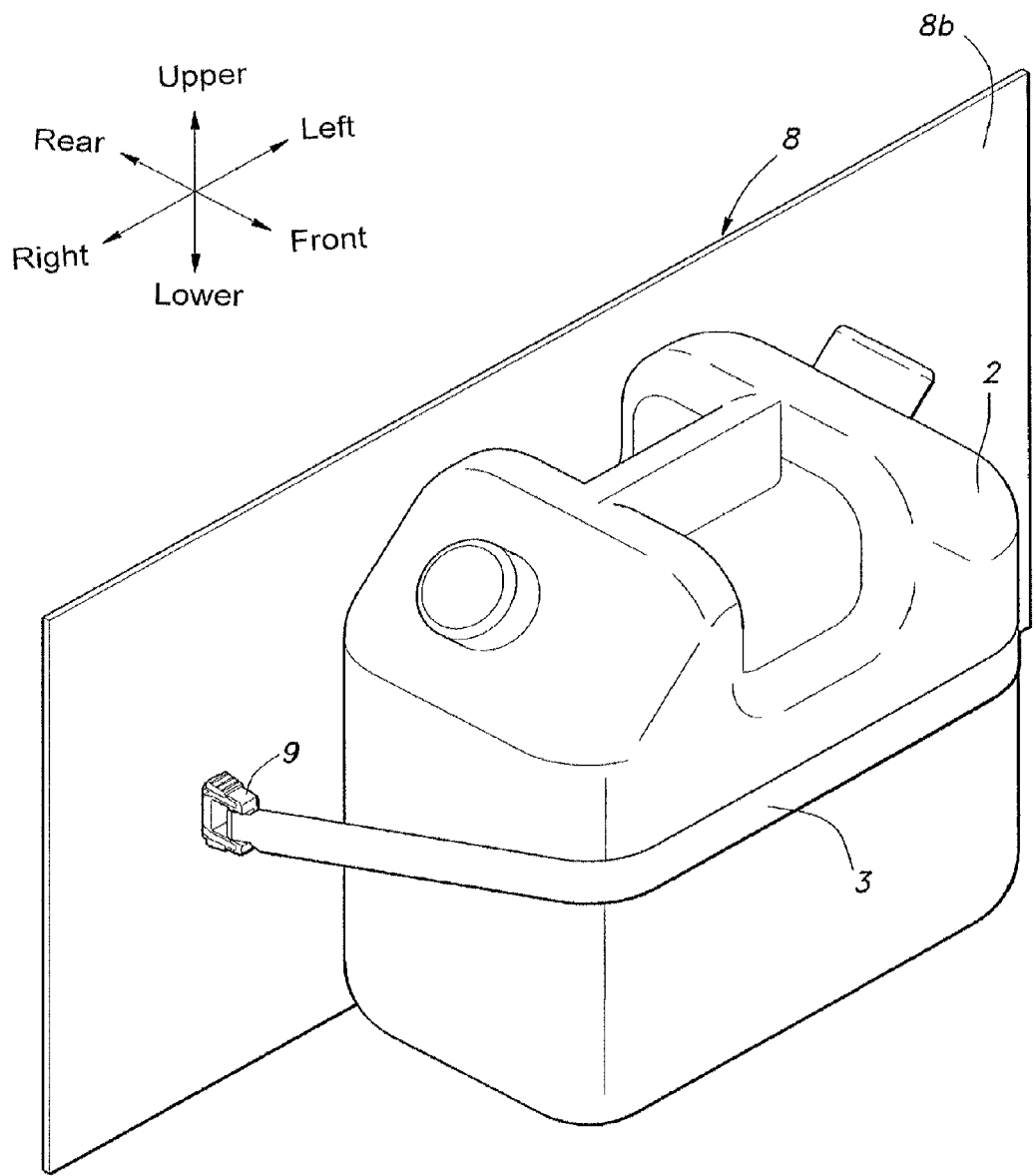
FIG. 2 is a front-side perspective view of the object holding device shown in FIG. 1.
Figure 3:
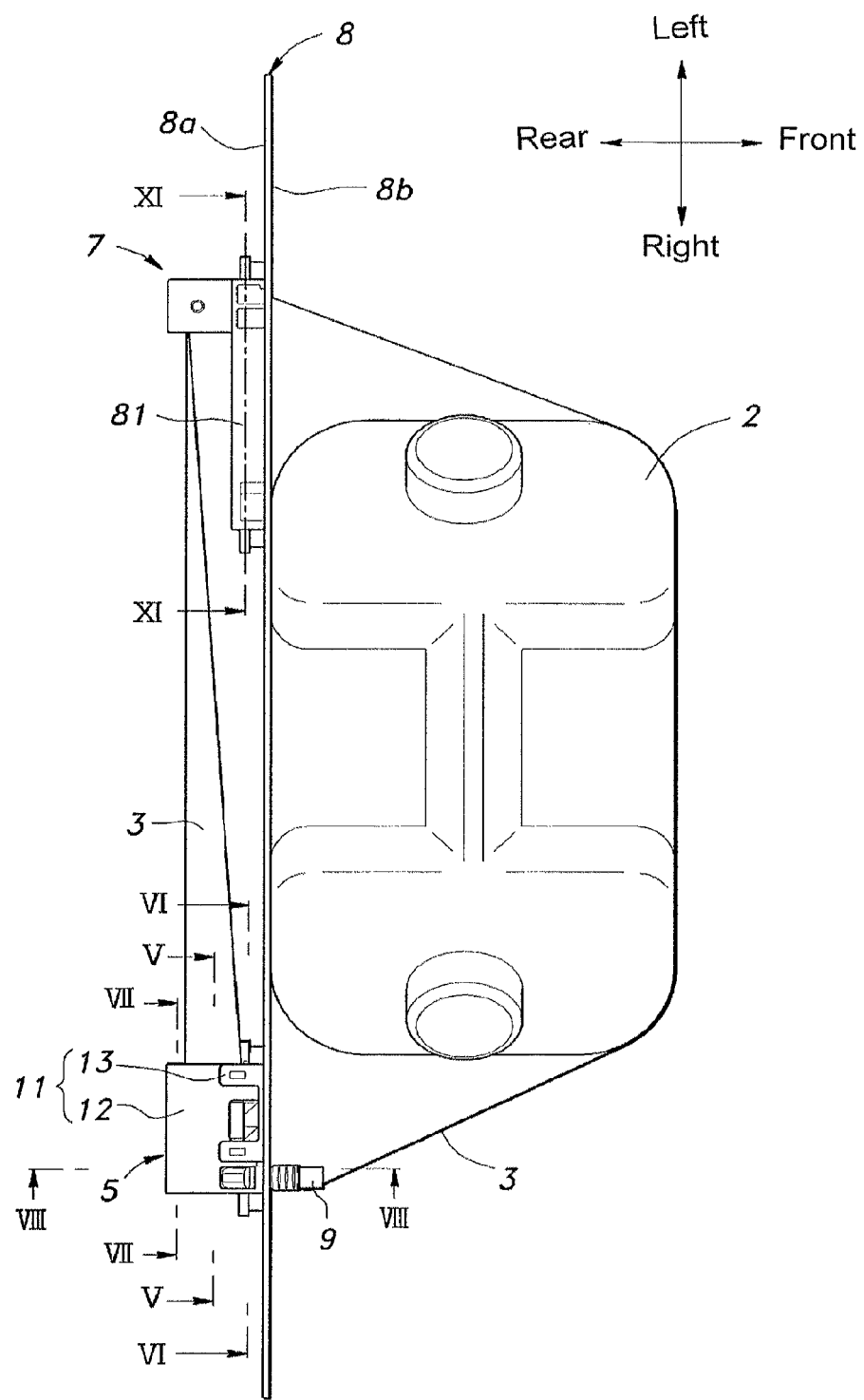
FIG. 3 is a plan view of the object holding device shown in FIG. 1.

As shown in FIG. 1 to FIG. 3, the object holding device 1 mainly includes a fixing belt 3 wound on an object as a target to be held (here, a plastic tank 2), a winding unit 5 that can wind the fixing belt 3 and a relay unit 7 on which an intermediate part of the fixing belt 3 fed from the winding unit 5 is wound, and fixes the object between luggage trim 8 that defines a luggage room (storage unit of the object) of a vehicle not shown and the fixing belt 3. The fixing belt 3 is made of synthetic fiber such as polyester, and a male buckle 9 is attached to a front end of the fixing belt 3.

Figure 4:
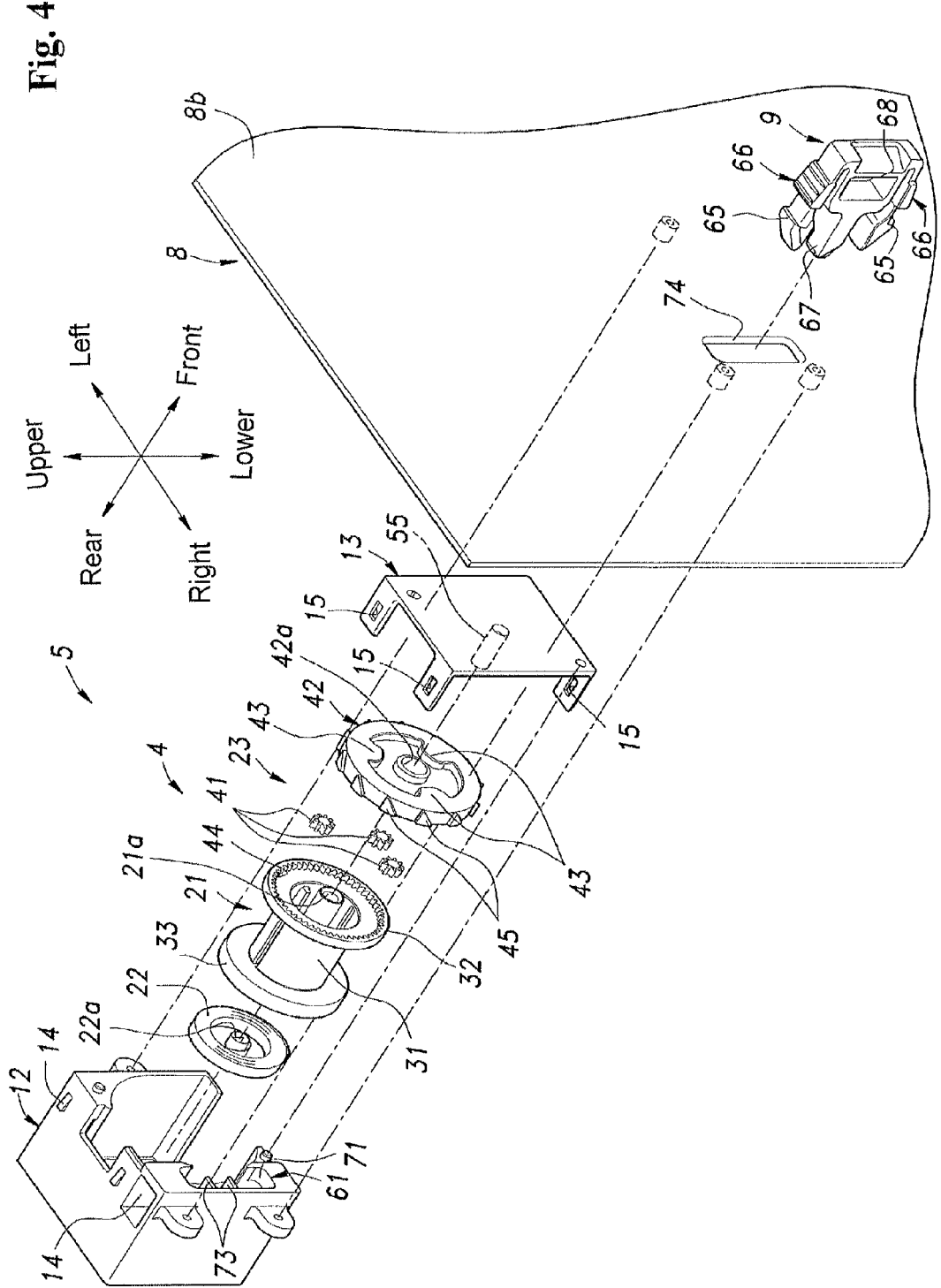
FIG. 4 is an exploded perspective view of a winding unit shown in FIG. 1.

As also shown in FIG. 4, the winding unit 5 further includes a reel 4 having the fixing belt 3 wound around and urged to rotate in the winding direction and a reel housing 11 that stores the reel 4 therein (refer to FIG. 1).

The reel housing 11 is configured of a body part 12 and a cover part 13 that closes an opening of the body part 12, and is fixed to a back surface 8a of the luggage trim 8 by means of a plurality of screws S (refer to FIG. 1). A plurality of engaging claws 14 provided on an upper surface and the lower surface of the body part 12 are engaged with a plurality of engaging holes 15 provided in the cover part 13, respectively, thereby coupling the body part 12 to the cover part 13.

The reel 4 is mainly configured of a cylindrical drum 21, a spiral spring 22 urging the drum 21 to rotate in the winding direction of the fixing belt 3 and a unidirectional clutch 23 provided coaxially with the drum 21.

Figure 5:
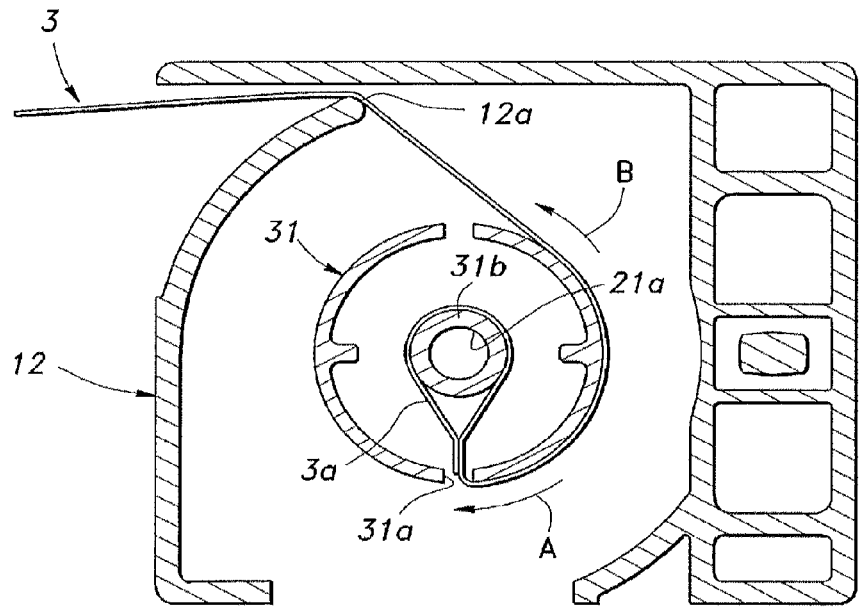
FIG. 5 is a cross-sectional view taken along the line V-V in FIG. 3.

The drum 21 has a tubular part 31 having the fixing belt 3 wound around and flange-like circular parts 32, 33 extending at front and rear ends of the tubular part 31. As shown in FIG. 5, the rear end of the fixing belt 3, which is provided with a loop part 3a, is inserted into the tubular part 31 through a slit 31a formed in the tubular part 31, and the loop part 3a is wound on shaft part 31b in the tubular part 31. The front end of the fixing belt 3 is fed to the outside of the winding unit 5 through a slit 12a formed in the body part 12 of the reel housing.

Figure 6:
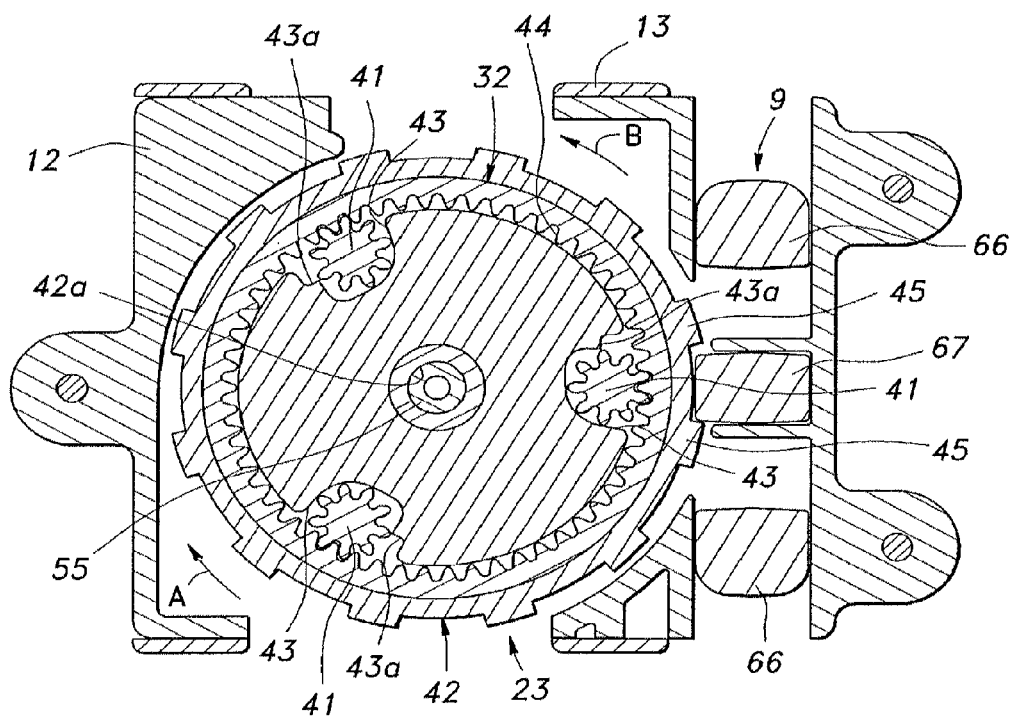
FIG. 6 is a cross-sectional view taken along the line VI-VI in FIG. 3.

As shown in FIG. 4 and FIG. 6, three planet gears 41 and a gear holder 42 are attached to the front circular part 32 of the drum 21. The gear holder 42 is provided so as to rotate with respect to the drum 21. Three concave parts 43 that rotatably hold the planet gears 41, respectively, are formed in the gear holder 42. Inner teeth 44 are formed over an inner circumferential surface of an outer edge protrudingly provided forward in the front circular part 32, and the planet gears 41 held in the concave parts 43 engage with the inner teeth 44, respectively.

When the drum 21 and the gear holder 42 rotate with respect to each other, each of the concave parts 43 allows rotation of each of the planet gears 41 in a forward direction (clockwise direction in FIG. 6), while restricting the rotation of each of the planet gears 41 in a reverse direction (counterclockwise direction in FIG. 6). This restriction of rotation in the reverse direction is achieved by engaging cut parts 43a formed by cutting a part of a site of the concave parts 43, which is opposed to the inner teeth 44, with a part of teeth of the planet gears 41. Thereby, the drum 21 can rotate with respect to the gear holder 42 in a direction represented by an arrow A in FIG. 6 (the winding direction of the fixing belt 3, which is represented by an arrow A in FIG. 5), while being non-rotatable with respect to the gear holder 42 in a direction represented by an arrow B (feeding direction of the fixing belt 3, which is represented by an arrow B in FIG. 5 (counter-winding direction)).

In this way, in the winding unit 5, the circular part 32 of the drum 21, the planet gears 41, and the gear holder 42 constitute the unidirectional clutch 23. The unidirectional clutch 23 has a publicly known configuration. If more detailed description of the configuration is needed, refer to Utility Model Registration Publication No. 2525010.

Figure 8:
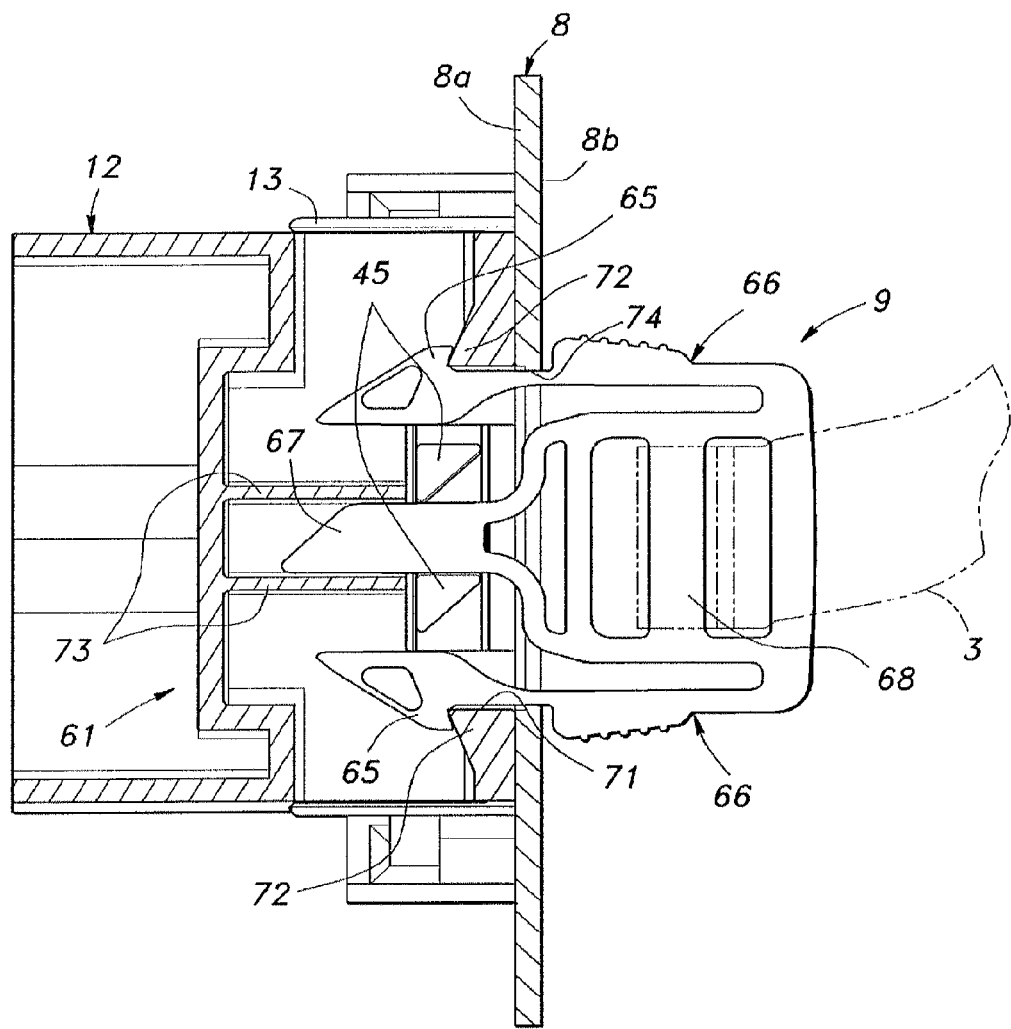
FIG. 8 is a cross-sectional view taken along the line XIII-XIII in FIG. 3.

As it will be described in details later, a plurality of engaged convex parts (engaged part) 45 protruding outwardly are disposed on an outer circumferential surface of the gear holder 42. An interval between the adjacent engaged convex parts 45 is, as shown in FIG. 8, set to have a dimension such that a side part of an inserting guide piece 67 of the male buckle 9 can be inserted into the interval. Each of the engaged convex parts 45 is substantially triangular and one vertex of the triangle is disposed in the front (a side into which the inserting guide piece 67 of the male buckle 9 is inserted).

Figure 7:
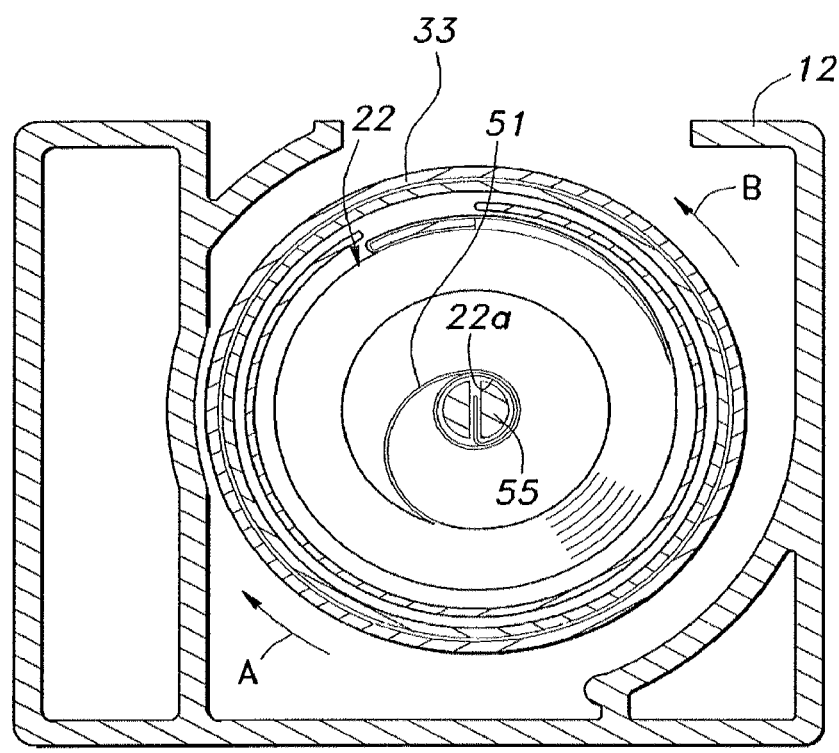
FIG. 7 is a cross-sectional view taken along the line VII-VII in FIG. 3.

As shown in FIG. 4 and FIG. 7, the spiral spring 22 is attached to the rear circular part 33 of the drum 21. The spiral spring 22 has a publicly known configuration, and by applying a rotational moment to a central shaft of the spiral (reel support shaft 55) to elastically deform a spring wire 51, the drum 21 is urged to rotate in the winding direction of the fixing belt 3, which is represented by an arrow A in FIG. 7.

As shown in FIG. 4, the drum 21, the gear holder 42, and the spiral spring 22 are stored in the reel housing 11 in the state where the reel support shaft 55 protrudingly formed on a rear surface of the cover part 13 of the reel housing 11 is inserted into a shaft hole 21a, a shaft hole 42a and a center 22a of the spiral spring.

As shown in FIG. 4, a buckle connecting part 61 connected to the male buckle 9 is formed at a right side part of the body part 12 of the reel housing 11. The male buckle 9 has a publicly known configuration and as shown in FIG. 8, includes a pair of elastically deformable leg parts 66, 66 each having a engaging claw 65 protruding outwardly, the inserting guide piece 67 protruding between the leg parts 66, 66 in the same direction as the leg parts 66, 66 and a belt loop part 68 to which the front end of the fixing belt 3 is fixed. On the contrary, the buckle connecting part 61 can be connected to the male buckle 9, and engaging protruding parts 72, 72 engaging with the engaging claws 65, 65 of the male buckle 9, respectively, are formed on the inner side of upper and lower edge of an insertion hole 71 into which the male buckle 9 is inserted. The buckle connecting part 61 has a pair of guide walls 73, 73 having a gap therebetween, into which the inserting guide piece 67 of the male buckle 9 is inserted. Both guide walls 73, 73 extend outward in parallel to the inserting direction of the male buckle 9. With such configuration, in the object holding device 1, the front end of the fixing belt 3 can be fixed to the reel housing 11 through an opening 74 of the luggage trim 8, which is formed in an attachment site of the reel housing 11.

Figure 9:
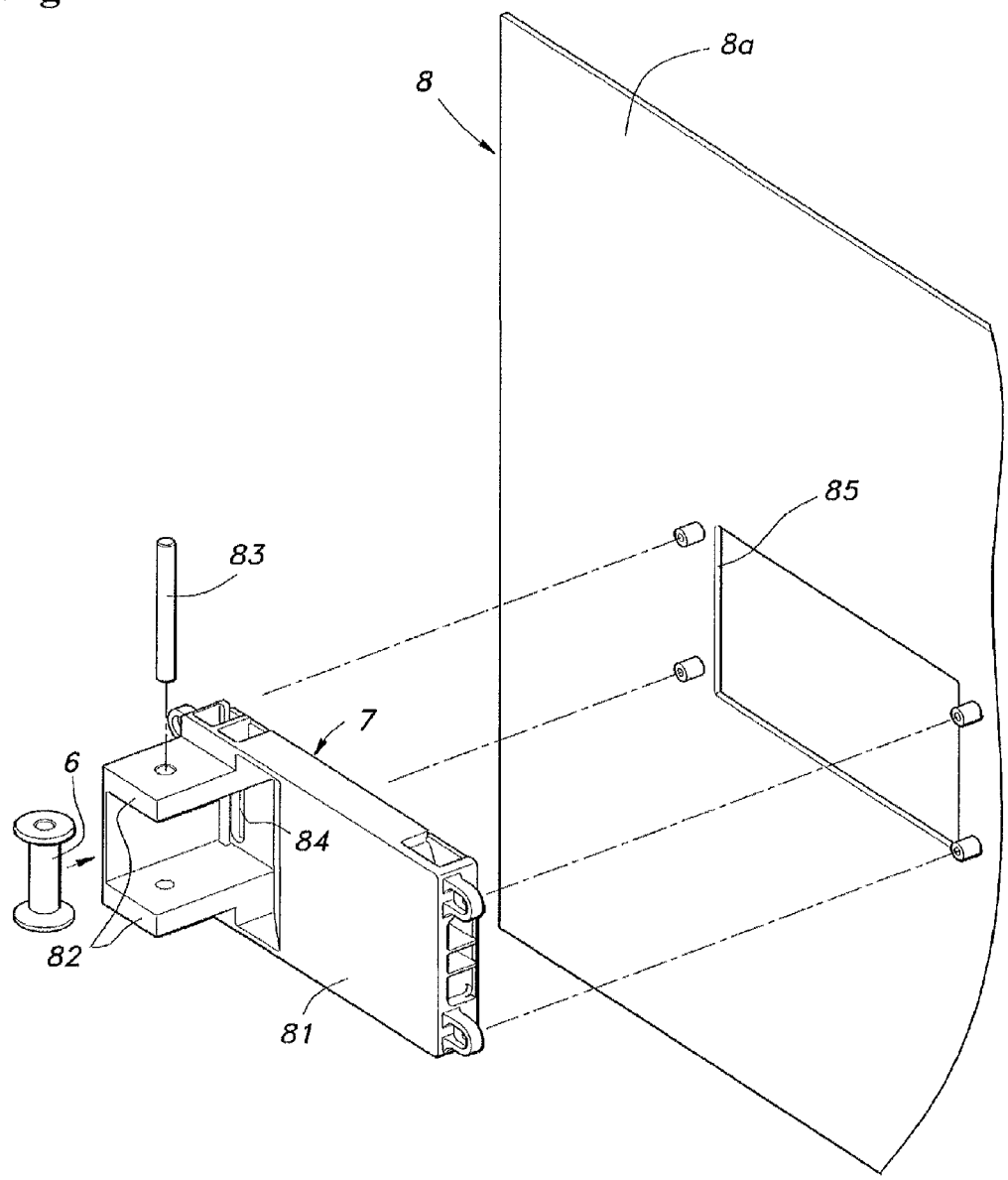
FIG. 9 is an exploded perspective view of a wound unit shown in FIG. 1.

As shown in FIG. 9, the relay unit 7 includes a cylindrical collar 6 on which the intermediate part of the fixing belt 3 is wound and a relay housing 81 that holds the collar 6, and like the reel housing 11, is fixed to the back surface 8a of the luggage trim 8 by means of the plurality of screws S (refer to FIG. 1). The collar 6 is held in the relay housing 81 by a support shaft 83 fixed between a pair of upper and lower support walls 82, 82. The collar 6 is indirectly attached to the luggage trim 8 through the relay housing 81, but can be also directly attached to the luggage trim 8.

The support shaft 83 of the relay unit 7 extends in the vertical direction, while the reel support shaft 55 of the winding unit 5 extends in the front-back direction. Accordingly, as shown in FIG. 1, the fixing belt 3 fed from the winding unit 5 is wound on the collar 6 in the state where it is twisted to the right toward the front end of the belt by 90 degrees. Then, the front end of the fixing belt 3 wound on the collar 6 is transported to a front surface 8b of the luggage trim 8 (refer to FIG. 2) through a vertically extending slit 84 and an opening 85 of the luggage trim 8, which is formed in an attachment site of the relay unit 7 (refer to FIG. 9). Since the size of the slit 84 (lateral width) is set such that the male buckle 9 cannot be inserted thereinto, the male buckle 9 (front end of the fixing belt 3) is located on the side of the front surface 8b of the luggage trim 8 at all time irrespective of the used state of the object holding device 1.

Figure 11:
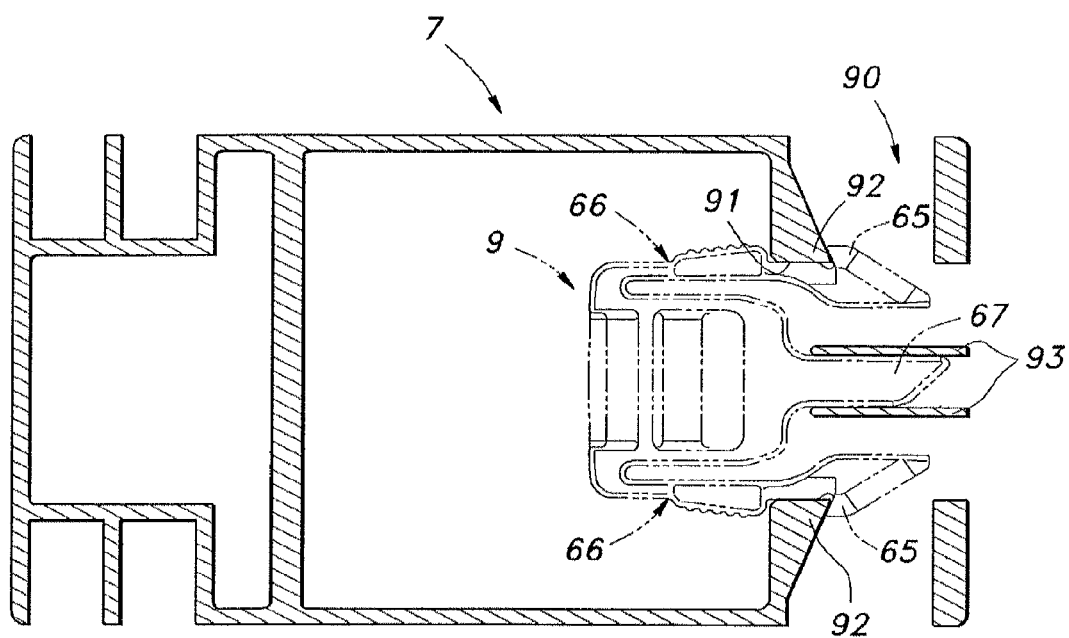
FIG. 11 is a cross-sectional view taken along the line XI-XI in FIG. 3.

Like the buckle connecting part 61, a buckle holding part 90, as shown in FIG. 11, can be connected to the male buckle 9, and engaged protruding parts 92 engaging with the engaging claws 65, 65 of the male buckle 9, respectively, are formed on the inner side of the upper and lower edge of a insertion hole 91 into which the male buckle 9 is inserted. The buckle holding part 90 has a pair of guide walls 93, 93 having a gap therebetween, into which the inserting guide piece 67 of the male buckle 9 is inserted.

Next, details of a method of using the object holding device 1 in accordance with the first embodiment will be described.

Figure 10:
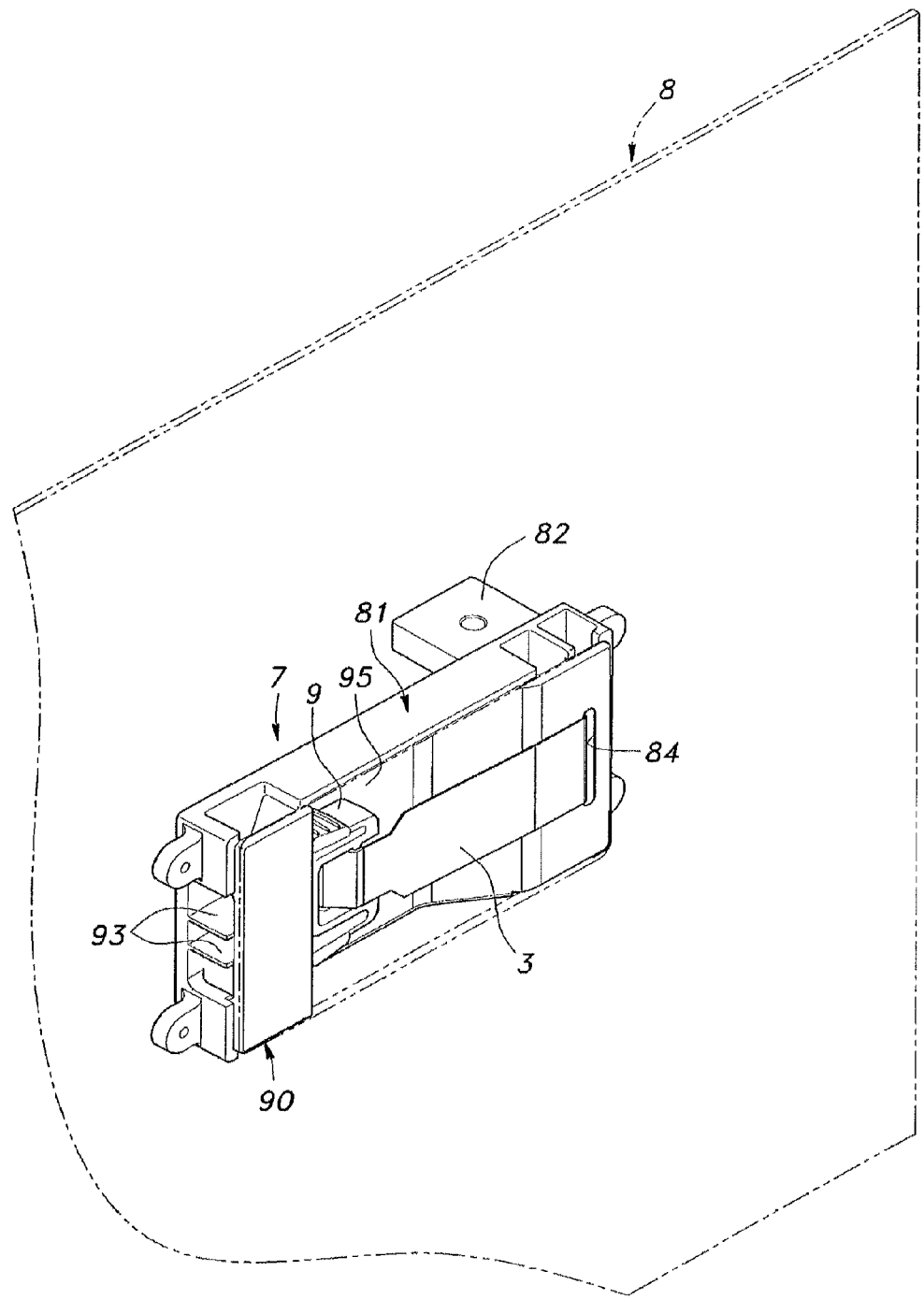
FIG. 10 is a front-side perspective view showing an unused state of the object holding device in accordance with the first embodiment.

As shown in FIG. 10, in the object holding device 1 in the unused state, the user can connect the male buckle 9 to the buckle holding part 90 provided on the front surface side of the relay unit 7.

Here, a buckle storing concave part 95 adjacent to the buckle holding part 90 (refer to FIG. 10) is provided on the front surface side of the relay housing 81. Thus, in the object holding device 1 in the unused state, the male buckle 9 connected to the buckle holding part 90 and the fixing belt 3 linked thereto do not protrude forward from the front surface 8b of the luggage trim 8. Such configuration can prevent that space of the luggage room (storing part for the object) becomes small due to the object holding device 1 in the unused state and the object holding device 1 in the unused state obstructs loading and unloading of the luggage and the like.

When fixing the object (here, the plastic tank 2) by the object holding device 1, the user removes the male buckle 9 connected to the buckle holding part 90 of the relay unit 7 and as shown in FIG. 1 to FIG. 3, winds the fixing belt 3 on a side surface of the plastic tank 2 disposed in the vicinity of the luggage trim 8 in the luggage room and then, connects the male buckle 9 to the buckle connecting part 61 of the reel housing 11.

At this time, the inserting guide piece 67 of the male buckle 9 is inserted between the guide walls 73, 73 of the buckle connecting part 61 and as shown in FIG. 6 and FIG. 8, a side part of the inserting guide piece 67 is inserted between the two engaged convex parts 45 of the gear holder 42, thereby restricting rotation of the gear holder 42. Thereby, the drum 21 is restricted from rotating in the direction represented by an arrow B in FIG. 6 (feeding direction of the fixing belt 3). On the contrary, the drum 21 can rotate in the direction represented by the arrow A in FIG. 6 (winding direction of the fixing belt 3) by the unidirectional clutch 23.

In this way, in the object holding device 1 in accordance with the first embodiment, when the male buckle 9 is connected to the buckle connecting part 61 of the reel housing 11, rotation in the feeding direction of the fixing belt 3 (counter-winding direction) is restricted. For this reason, in fixing the plastic tank 2, the user only needs to connect the male buckle 9 to the reel housing 11 from which the fixing belt 3 is fed, thereby preventing looseness of the fixing belt 3 without requiring any user's special operation.

In the object holding device 1, since the unidirectional clutch 23 that allows rotation of the drum 21 only in the winding direction when the male buckle 9 is connected to the reel housing 11 is provided, even when the fixing belt 3 wound on the plastic tank 2 is excessively fed, the user can rewind the fixing belt 3 around the drum 21 to adjust the effective length of the fixing belt 3, thereby preventing looseness of the fixing belt 3.

Depending on the circumstance, the unidirectional clutch 23 may be omitted from the object holding device 1. In that case, engaged parts like the engaged convex parts 45 of the gear holder 42 can be provided on the outer circumferential surface of the front circular part 32 of the drum 21. Thus, when the male buckle 9 is connected to the buckle connecting part 61 of the reel housing 11, the drum 21 is restricted from rotating in any directions.

Further, in the object holding device 1, since the relay unit 7 is attached to the luggage trim 8 with a predetermined interval from the winding unit 5, the luggage trim 8 that configures the storing part for the plastic tank 2 and the fixing belt 3 can stably sandwich the plastic tank 2 therebetween. The relay unit 7 is not necessarily an essential constituent and may be omitted. In that case, the plastic tank 2 is held in the state where the fixing belt 3 is wound on the substantially whole circumference of the plastic tank 2. Depending on the circumstance, the opening of the luggage trim 8 may be provided with a relay function like the relay unit 7.

Second Embodiment

Next, an object holding device in accordance with the second embodiment of the present invention will be described with reference to FIG. 12 to FIG. 25. In those figures, the same reference numerals are given to the same constituents as those in the first embodiment. Detailed description of the same matters in the second embodiment as those in the first embodiment is omitted.

Figure 12:
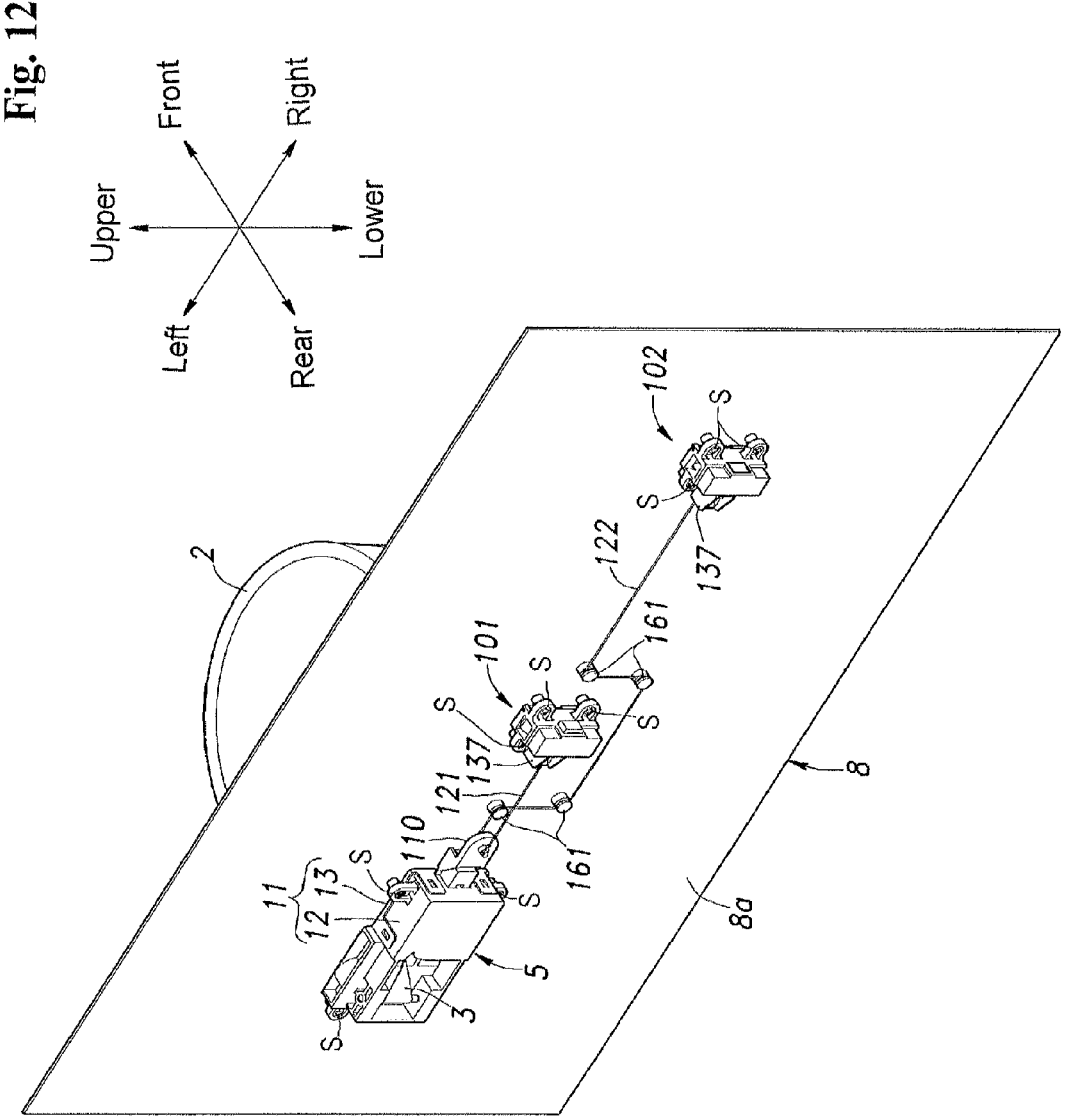
FIG. 12 is a back-side perspective view showing a used state of an object holding device in accordance with a second embodiment.
Figure 13:
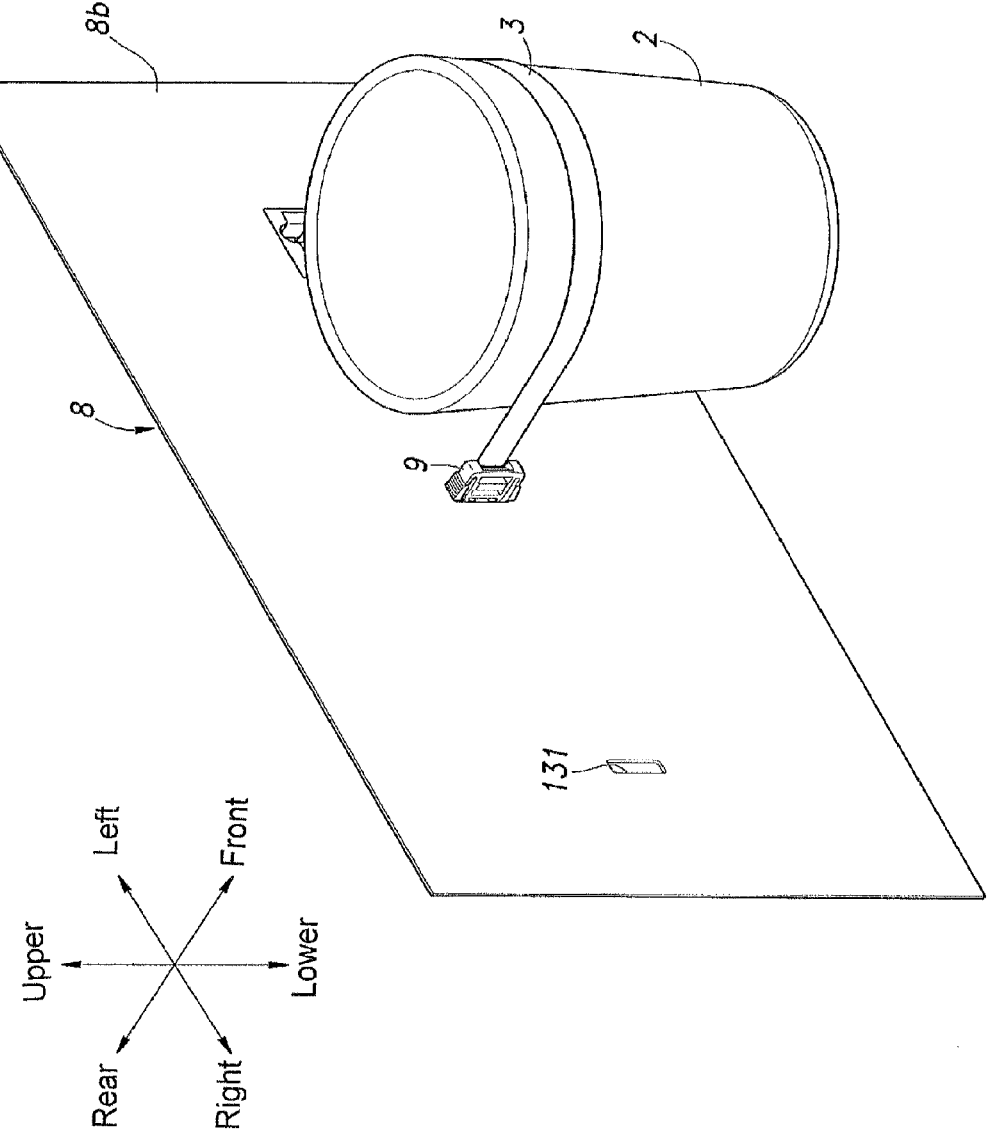
FIG. 13 is a front-side perspective view of the object holding device shown in FIG. 12.
Figure 14:
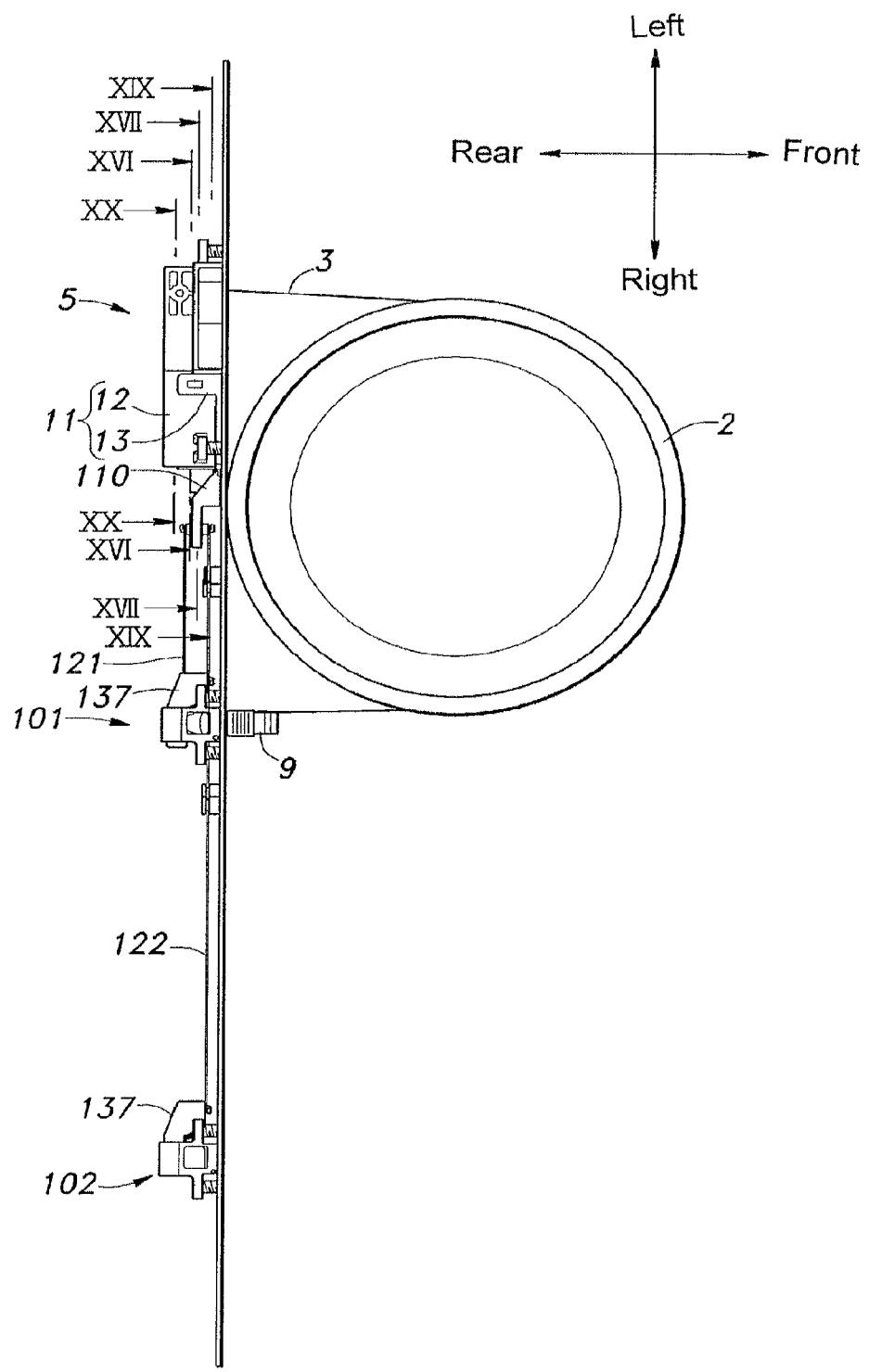
FIG. 14 is a plan view of the object holding device shown in FIG. 12.

As shown in FIG. 12 to FIG. 14, the object holding device 1 mainly includes the fixing belt 3 wound on the object as the target to be held (here, a closed-end cylindrical container 2), and the winding unit 5 configured to wind the fixing belt 3, and a first connecting unit 101 and a second connecting unit 102 to which the male buckle 9 attached to the front end of the fixing belt 3 is selectively connected. That is, in the object holding device 1 in accordance with the second embodiment, the relay unit in the first embodiment is omitted and the winding unit 5 is provided at a position of the relay unit.

Further, the first and second connecting units 101, 102, to which the male buckle 9 is to be connected, are attached to the luggage trim 8.

Figure 15:
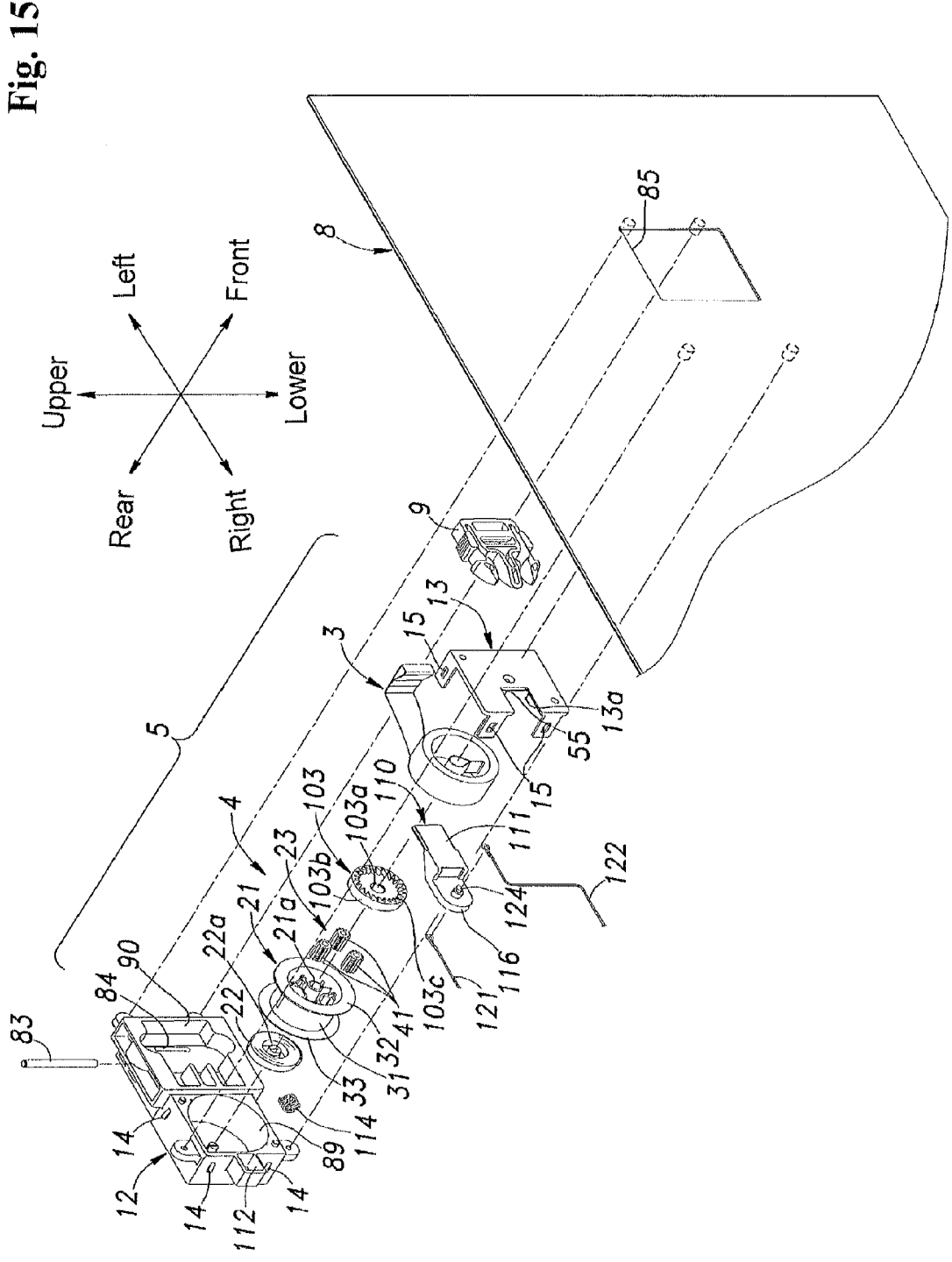
FIG. 15 is an exploded perspective view of a winding unit shown in FIG. 12.
Figure 16:
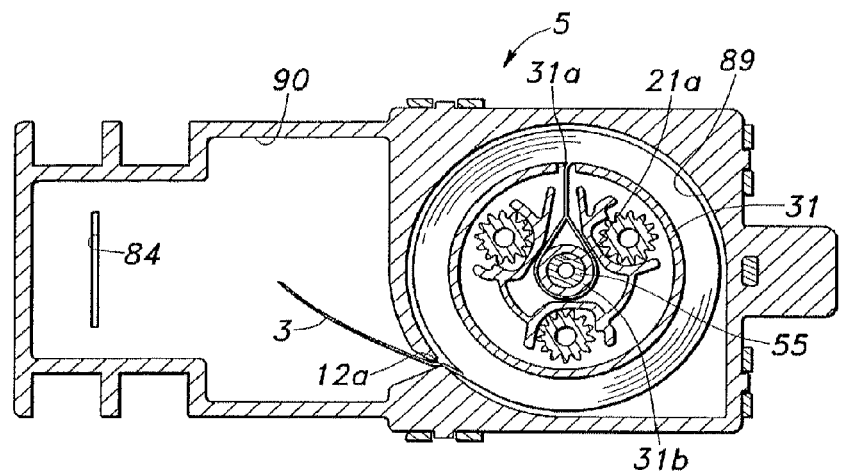
FIG. 16 is a cross-sectional view taken along the line XVI-XVI in FIG. 14.

As shown in FIG. 15, in the winding unit 5, the body part 12 of the reel housing is provided with a reel holding part 89 that stores the reel 4 therein and the buckle holding part 90 that has the same function as that shown in FIG. 10 and FIG. 11 to hold the male buckle 9 in the unused state of the object holding device. The slit 84 into which the fixing belt 3 is inserted is formed in the buckle holding part 90. As shown in FIG. 16, the fixing belt 3 is fed toward the buckle holding part 90 of the reel holding part 89 through the slit 12a formed in the body part 12 of the reel housing, is wound on the support shaft 83 (refer to FIG. 15) and then, is transported to the outside (the front of the luggage trim 8) through the slit 84.

Figure 17:
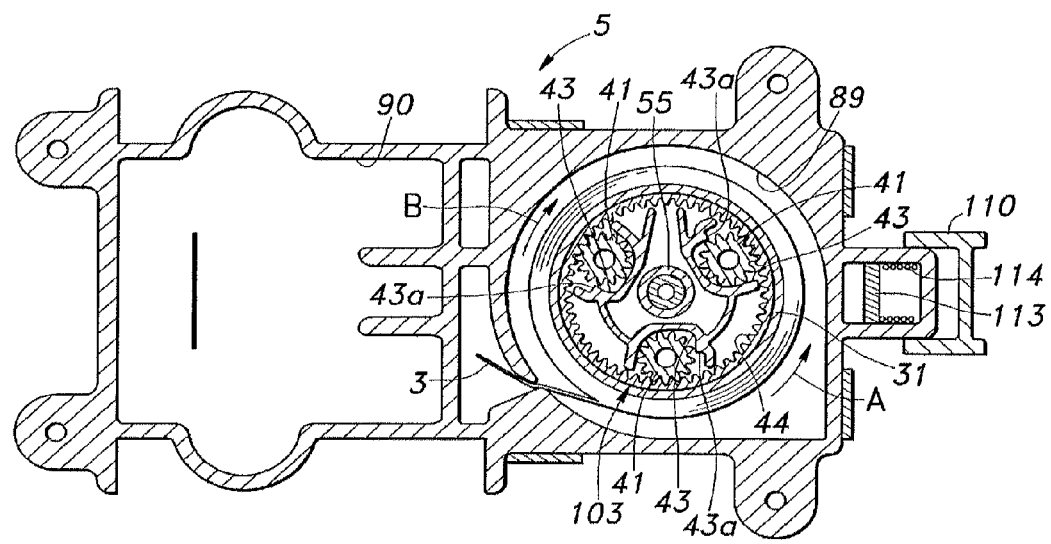
FIG. 17 is a cross-sectional view taken along the line XVII-XVII in FIG. 14.

As shown in FIG. 15 or FIG. 17, the three concave parts 43 provided at the inner front side of the tubular part 31 of the drum 21 constituting the reel hold the planet gears 41, respectively. The inner teeth 44 are formed on a whole inner circumference of an outer edge 103b protruding from a central disc part, in which shaft hole 103a is formed, in a restricted member 103 held in the tubular part 31 so as to be rotatable with respect to the drum 21. The inner teeth 44 can engage with the planet gears 41 held by the concave parts 43.

Here, when the drum 21 and the restricted member 103 rotate with respect to each other, each of the concave parts 43 allows rotation of each of the planet gears 41 in the forward direction (clockwise direction in FIG. 17) and restricts rotation of each of the planet gears 41 in the reverse direction (counterclockwise direction in FIG. 17). Thereby, the drum 21 can rotate with respect to the restricted member 103 in a direction represented by an arrow A in FIG. 17 (that is, the winding direction of the fixing belt 3) and cannot rotate with respect to the restricted member 103 in a direction represented by an arrow B (that is, the feeding direction of the fixing belt 3).

In this way, in the winding unit 5, the tubular part 31 (concave parts 43) of the drum 21, the planet gears 41, and the restricted member 103 constitute the unidirectional clutch 23.

Figure 18:
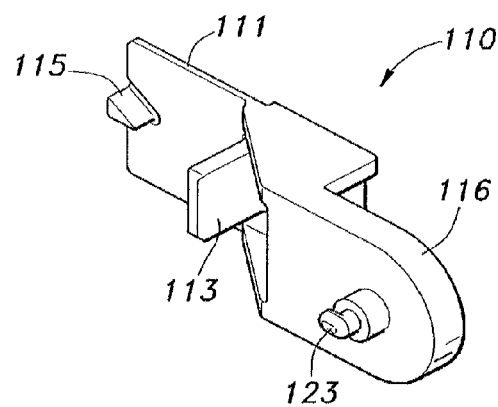
FIG. 18 is a perspective view of a restricting member in FIG. 15 when viewed from behind.

As shown in FIG. 15 or FIG. 18, the winding unit 5 is provided with a restricting member 110 that restricts rotation of the reel 4. The restricting member 110 has a restricting piece 111 movably fitted into a notch 13a formed in the cover part 13 of the winding unit 5 and a guide piece 113 extending in a direction orthogonal to the restricting piece 111 and movably inserted into a square tube-like guide hole 112 formed in the body part 12 of the winding unit 5. The guide piece 113 is urged to move in an advancing direction (leftward) by a compression spring 114 to be stored in the guide hole 112 together with the guide piece 113. The restricting member 110 is guided by the notch 13a and the guide hole 112 to advance or retreat in the lateral direction.

As it will be described in detail later, an engaging claw 115 that restricts rotation of the reel 4 is provided at a front end of a rear surface of the restricting piece 111. Fixing shafts 123, 124 that fix one ends of coupling string 121, 122 hung across the first and second connecting units 101, 102, respectively, are coaxially and protrudingly provided on both surfaces (front and rear surfaces in FIG. 15) of a coupling piece 116 extending in the reverse direction to the restricting piece 111.

Figure 19:
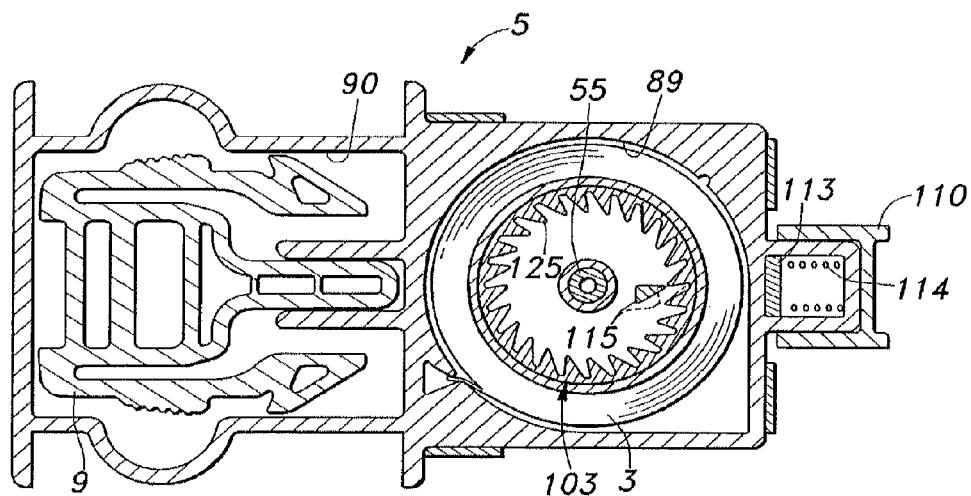
FIG. 19 is a cross-sectional view taken along the line XIX-XIX in FIG. 14.

As shown in FIG. 15 and FIG. 19, inner teeth 125 are formed on a whole inner circumference of an outer edge 103c protrudingly provided forward from a central disc part in the restricted member 103. When the restricting member 110 retreats (when the engaging claw 115 moves from a position represented by a solid line in FIG. 19 to a position represented by a chain double-dashed line), the inner teeth 125 engage with the engaging claw 115.

Figure 20:
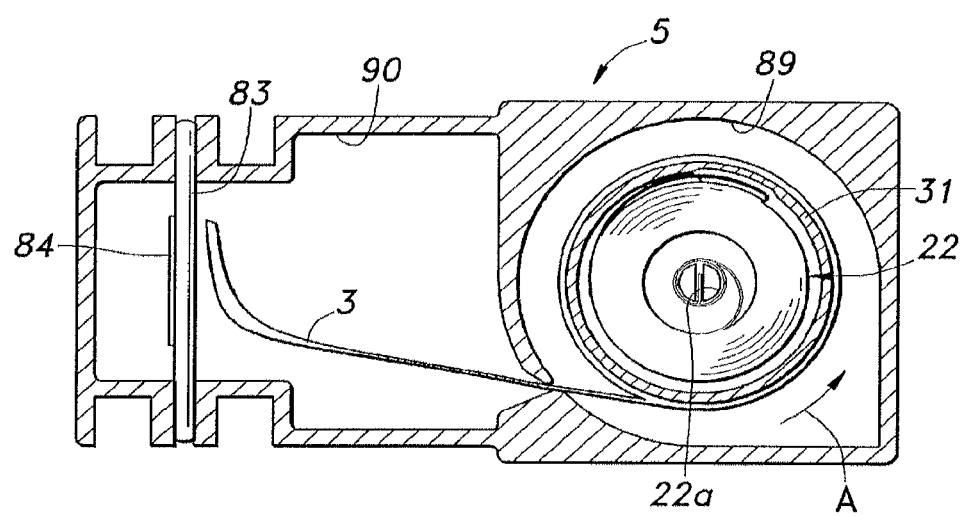
FIG. 20 is a cross-sectional view taken along the line XX-XX in FIG. 14.

As shown in FIG. 15 and FIG. 20, the spiral spring 22 is attached to the inner rear part of the tubular part 31 of the drum 21. The spiral spring 22 urges the drum 21 to rotate in the winding direction of the fixing belt 3, which is represented by an arrow A in FIG. 20.

Figure 21:
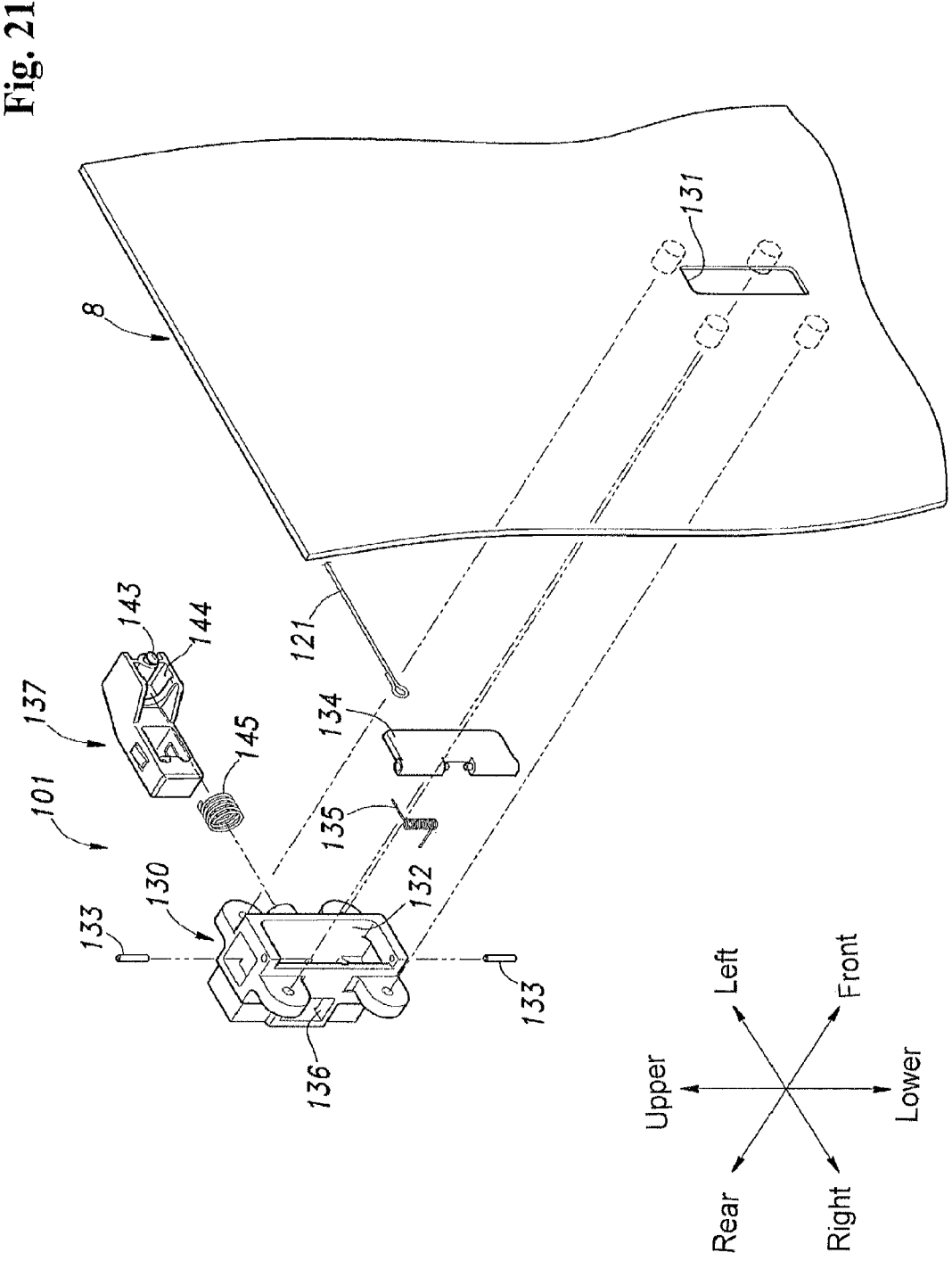
FIG. 21 is an exploded perspective view of a first connecting unit shown in FIG. 12.

As shown in FIG. 21, the first connecting unit 101 has a body part 130 to which the male buckle is connected. The male buckle is inserted into an insertion hole 132 formed in the body part 120 through an opening 131 of the luggage trim 8. The insertion hole 132 is opened/closed by a cover piece 134 held rotatably about a rotational shaft 133. The cover piece 134 is urged to move in a closing direction by a torsion spring 135, and is opened by rotating inwardly at insertion of the male buckle. In the body part 120, a sliding member 137 that advances or retreats according to insertion or pulling of the male buckle-out into or out of the insertion hole 132 is held in a through hole 136 extending in a direction orthogonal to the insertion hole 132 (that is, a direction orthogonal to the inserting direction of the male buckle).

Figure 22:
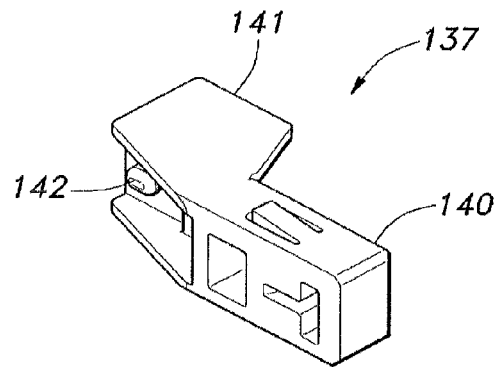
FIG. 22 is a perspective view of a sliding member in FIG. 21 when viewed from rear.

As shown in FIG. 21 or FIG. 22, the sliding member 137 has an inserting part 140 inserted into the through hole 136 and a coupling part 141 coupled to the winding unit 5 through the coupling string 121 or the coupling string 122 (refer to FIG. 5). Fixing shafts 142, 143 that can fix the other end of the coupling string 121 or the coupling string 122 are coaxially and protrudingly provided on both sides (front and rear sides in FIG. 21) of the coupling part 141. The sliding member 137 is urged to move in an advancing direction (leftward in FIG. 21) by a compression spring 145 stored in a spring storing part 144 inner of the coupling part 141.

Figure 23:
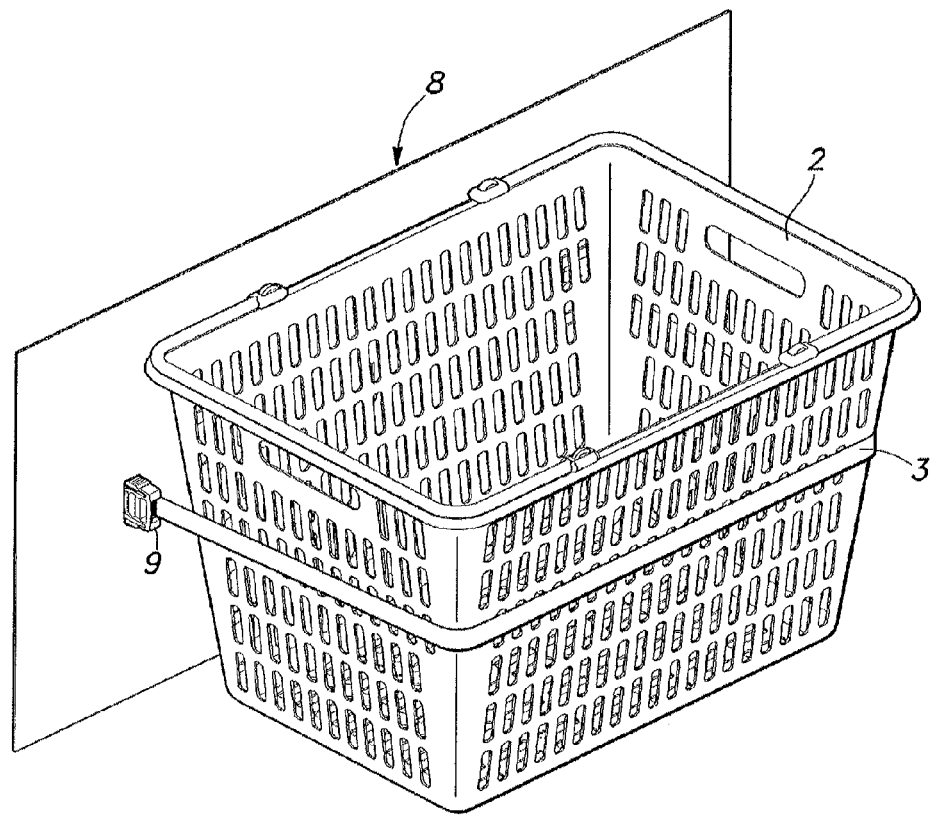
FIG. 23 is a back-side perspective view showing another used state of the object holding device in accordance with the second embodiment.

As shown in FIG. 23, the second connecting unit 102 is used, for example, when the fixing belt 3 is wound on an object (here, a shopping basket 2) that is different from the above-mentioned closed-end cylindrical container 2 in size. Since the second connecting unit 102 has the same configuration as the first connecting unit 101 except for the attachment position to the luggage trim 8, detailed description is omitted. Although the two connecting units are provided in this embodiment, the number and the attachment position of the connecting units can be appropriately interchanged.

Next, details of a method of using the object holding device 1 in accordance with the second embodiment will be described.

Figure 24:
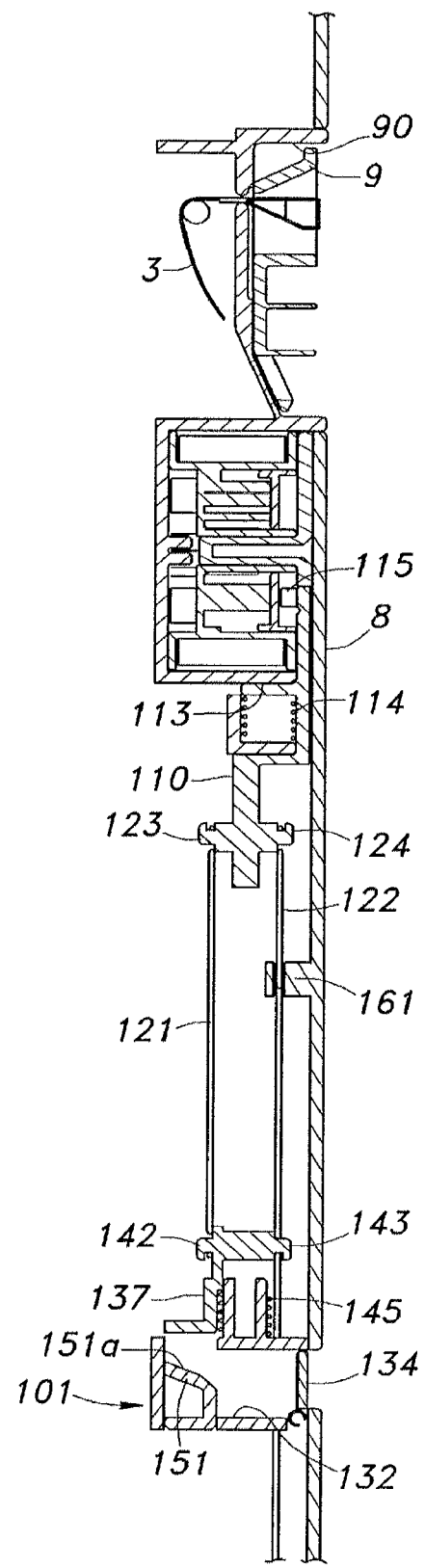
FIG. 24 is a transverse cross-sectional view showing an unused state of the object holding device in accordance with the second embodiment.

As shown in FIG. 24, in the object holding device 1 in the unused state, the user can connect the male buckle 9 to the buckle holding part 90 provided on the front surface of the winding unit 5.

At this time, the sliding member 137 is located at an advanced position by an urging force of the compression spring 145. Similarly, the restricting member 110 is coupled to the sliding member 137 through the tensed coupling string 121 and is located at an advanced position (release position) by an urging force of the compression spring 114. Accordingly, as represented by a solid line in FIG. 19, an engaging claw 126 of the restricting member 110 is located where the restricting member 110 does not engage with the inner teeth 125 of the restricted member 103, and the drum 21 that holds the fixing belt 3 is rotatable.

Figure 25:
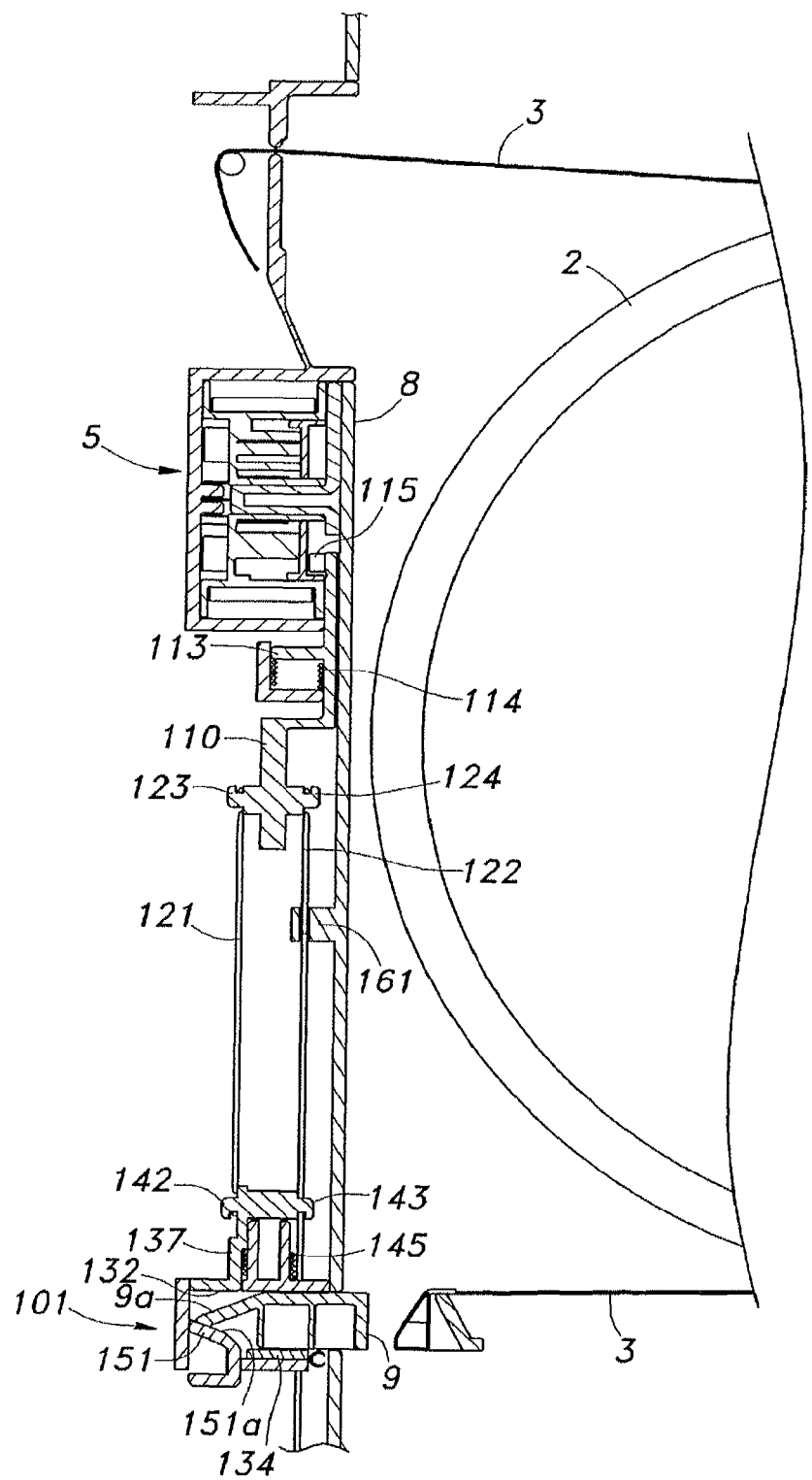
FIG. 25 is a transverse cross-sectional view showing the used state of the object holding device in accordance with second embodiment.

When fixing the object by the object holding device 1, as shown in FIG. 25, the user removes the male buckle 9 from the buckle holding part 90 and winds the fixing belt 3 on the object and then, connects the male buckle 9 to the first connecting unit 101.

At this time, when the male buckle 9 is inserted into the insertion hole 132 of the first connecting unit 101, a front end 9a contacts against a pressing part 151 formed in the insertion hole 132. The pressing part 151 has a contact surface 151a inclined relative to the inserting direction of the male buckle 9. When the male buckle 9 is further inserted, the front end 9a moves on the contact surface 151a while pressing the contact surface 151a. Thereby, the sliding member 137 moves to the retreated position against the urging force of the compression spring 145.

This movement of the sliding member 137 generates tension in the coupling string 121, resulting in that the restricting member 110 moves to the retreated position (restriction position) against the urging force of the compression spring 114. As a result, as represented by a chain double-dashed line in FIG. 19, the engaging claw 115 of the restricting member 110 moves to a position where the engaging claw 115 engages with the inner teeth 125 of the restricted member 103, thereby restricting rotation of the drum that holds the fixing belt 3 (rotation of the fixing belt 3 in the feeding direction).

Although detailed description is omitted, in the case of using the second connecting unit 102, tension generated in the coupling string 122 similarly causes the restricting member 110 to move to the retreated position.

Here, as shown in FIG. 24 and FIG. 25, both ends of the coupling string 121 are fixed to the fixing shaft 123 of the restricting member 110 and the fixing shaft 142 of the sliding member 137, which protrudingly provided opposite to the luggage trim 8, respectively. Both the ends of the coupling string 122 are fixed to the fixing shaft 124 of the restricting member 110 and the fixing shaft 143 of the sliding member 137, which protrudingly provided toward the luggage trim 8, respectively. Thereby, a distance between the coupling string 121 and the luggage trim 8 is different from a distance between the coupling string 122 and the luggage trim 8, so that arrangement routes of both the strings can be suitably ensured. By being wound on a plurality of wounded shafts 161 as shown in FIG. 12, the coupling string 122 is arranged so as to bypass the first connecting unit 101 located between the second connecting unit 102 and the winding unit 5.

In this way, in the object holding device 1 in accordance with the second embodiment, since the first and second connecting units 101, 102 to which the male buckle 9 is connected are provided apart from the winding unit 5 (reel housing 11), the number and attachment position of connecting units to which the male buckle 9 is connected can be freely set and thus, various objects in shape and size can be stably held. In the first embodiment, in order to stably hold the object, the relay unit that separates both ends of the fixing belt from each other (the wound member on which the intermediate part of the fixing belt is wound) is required. However, in the second embodiment, such relay unit is not required, so that a large load is not imposed on the relay unit and the fixing belt located between the relay unit and the reel.

Although the present invention has been described in detail based on certain embodiments, the above-mentioned embodiments are merely examples and the present invention is not limited to these embodiments. For example, the object holding device according to the present invention can be installed any space that can store the object therein not limited to the luggage room of the vehicle. The target to be held by the object holding device is not limited to the above-mentioned plastic tank 2 and may be any object on which the cord-like body is wound. The cord-like body wound on the object is not limited to the above-mentioned fixing belt 3 and may be, for example, a cable, a rope, a string, a wire and other ropes. The engaging member (male buckle 9) is not necessarily attached to the front end of the cord-like body and can be installed at any position of the cord-like body as long as a region of the cord-like body wound on the object can be ensured. According to circumstances, a part of the cord-like body may be shaped like a hook and the hook-shaped part may function as the engaging member. All of the constituents of the object holding in accordance with the above-mentioned embodiments of the present invention are not essential and may be appropriately selected so as not to deviate from the scope of the present invention.

DESCRIPTION OF REFERENCE SIGNS

1: object holding device
2: plastic tank (object)
3: fixing belt (cord-like body)
4: reel
5: winding unit
6: collar (wound member)
7: relay unit
8: luggage trim (wall member)
9: male buckle (engaging member)
11: reel housing (connecting member)
12: body part
13: cover part
21: drum (winding shaft)
23: unidirectional clutch
31: tubular part
32, 33: circular part
41: planet gear
42: gear holder
43: concave part
44: inner teeth
45: engaged convex part (engaged part)
55: reel support shaft
61: buckle connecting part
67: inserting guide piece
73: guide wall
81: relay housing
90: buckle holding part
91: insertion hole
95: buckle storing concave part
101: first connecting unit (connecting member)
102: second connecting unit (connecting member)
110: restricting member
121, 122: coupling string (coupling member)

What is claimed is:

1. An object holding device comprising:
a cord-like body adapted to wind on an object to be held;
an engaging member provided on the cord-like body;
a reel around which the cord-like body is wound, the reel including an engaged part engaging the engaging member, and being urged to rotate in a winding direction of the cord-like body;
a reel housing storing the reel therein, and having a connecting member connectable to the engaging member therein; and
a wound member arranged separately from the reel housing, the cord-like body fed from the reel being wound at the wound member,
wherein a rotation of the reel is restricted at least in a counter-winding direction of the cord-like body when the engaging member engages the engaged part of the reel.

2. An object holding device according to claim 1, wherein the reel includes a winding shaft around which the cord-like body is wound, and a unidirectional clutch allowing a rotation of the winding shaft only in the winding direction when the engaging member engages the engaged part of the reel.

3. An object holding device according to claim 1, further comprising a wall member including a storing part for storing the object,
wherein the reel housing and the wound member are attached to the wall member.

4. An object holding device comprising:
a cord-like body adapted to wind on an object to be held;
an engaging member provided on the cord-like body;
a reel around which the cord-like body is wound, the reel being urged to rotate in a winding direction of the cord-like body;
a reel housing storing the reel therein;
a connecting member connectable to the engaging member, the connecting member being arranged separately from the reel housing;
a restricting member attached to the reel housing and provided movably between a restriction position restricting a rotation of the reel in a counter-winding direction of the cord-like body and a release position releasing restriction of the rotation of the reel in the counter-winding direction of the cord-like body; and
a coupling member coupling the restricting member to the connecting member to move the restricting member in conjunction with the connecting member,
wherein the restricting member moves from the release position to the restriction position through the coupling member in response to the engaging member being connected to the connecting member.

5. An object holding device according to claim 1, wherein the engaged part of the reel includes a plurality of protrusions radially provided thereon, and the engaging member includes an inserting guide piece at one end portion thereof; and the inserting guide piece is positioned between two of the plurality protrusions to restrict the rotation of the reel in the counter-winding direction of the cord-like body when the engaging member engages the engaged part of the reel.

6. An object holding device according to claim 1, wherein the wound member includes a recess at one surface portion thereof to store the engaging member when the object holding device is not used.

7. An object holding device according to claim 4, wherein the connecting member includes a sliding member movably connected to the coupling member,
wherein the sliding member and the restricting member are connected through the coupling member, and the sliding member moves toward the restricting member to move the restricting member from the release position to the restriction position through the coupling member in response to the engaging member being connected to the connecting member.

* * * * *